US011066173B2

United States Patent
Davis et al.

(10) Patent No.: US 11,066,173 B2

(45) Date of Patent: Jul. 20, 2021

(54) MULTI-FUNCTION CREDENZA

(71) Applicant: Textron Aviation Inc., Wichita, KS (US)

(72) Inventors: David Wayne Davis, Wichita, KS (US); Frank Joseph Rowe, Wichita, KS (US); Jason Michael Decker, Wichita, KS (US); Matthew Robert Harrell, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 502 days.

(21) Appl. No.: 15/797,769

(22) Filed: Oct. 30, 2017

(65) Prior Publication Data

US 2018/0118350 A1 May 3, 2018

Related U.S. Application Data

(60) Provisional application No. 62/415,128, filed on Oct. 31, 2016.

(51) Int. Cl.

*B64D 11/06* (2006.01)
*A47B 83/00* (2006.01)

(Continued)

(52) U.S. Cl.

CPC .............. *B64D 11/064* (2014.12); *A47B 1/05* (2013.01); *A47B 83/00* (2013.01); *A47B 85/04* (2013.01);

(Continued)

(58) Field of Classification Search

CPC .............. B64D 11/064; B64D 11/0601; B64D 11/0605; B64D 11/0627; B64D 11/0636;

(Continued)

(56) References Cited

U.S. PATENT DOCUMENTS 2,332,841 A * 10/1943 Buckwalter ........ B64D 11/0601 244/118.6
2,981,313 A * 4/1961 Odell .................... A47C 13/00 297/135

(Continued)

OTHER PUBLICATIONS

NEFF Ovens, NEFF Slide & Hide Ovens 2013, Sep. 3, 2013, NEFF Australia, https://www.youtube.com/watch?v=zkJNDaTVEdM (Year: 2013).*

*Primary Examiner* — Richard R. Green
*Assistant Examiner* — William L Gmoser
(74) *Attorney, Agent, or Firm* — Erise IP, P.A.

(57) ABSTRACT

A multi-function credenza includes at least one cabinet with a first top surface and a seat adjacent the cabinet. The seat has a convertible seat back for converting to a second top surface adjacent to the first top surface when the seat is stowed. A multi-function credenza in an aircraft cabin includes a first cabinet that has a first inboard panel and a first top surface, a second cabinet that has a second inboard panel and a second top surface, and a stowable seat located between the first cabinet and the second cabinet. A stowable seat includes a seat back that has a first side adapted for seating in a first mode and a second side adapted as a working surface in a second mode. The seat back articulates between the first mode and the second mode for deploying and stowing the seat, respectively.

17 Claims, 9 Drawing Sheets

100 101 121 130 132 122 111 102 135 113 134 112

(51) Int. Cl.

| | |
|---|---|
| ***A47B 85/04*** | (2006.01) |
| ***A47B 85/08*** | (2006.01) |
| ***A47B 1/05*** | (2006.01) |
| *A47B 13/02* | (2006.01) |

(52) U.S. Cl.
CPC ...... *B64D 11/0601* (2014.12); *B64D 11/0605* (2014.12); *B64D 11/0627* (2014.12); *A47B 13/023* (2013.01); *A47B 85/08* (2013.01); *A47B 2001/053* (2013.01)

(58) Field of Classification Search
CPC . B64D 11/0638; B64D 11/0639; B64D 11/04; B64D 11/0696; A47B 1/05; A47B 83/00; A47B 85/04; A47B 13/023; A47B 85/08; A47B 2001/053; A47B 51/00; A47B 49/00; A47B 49/004; A47B 3/063; A47B 3/14; A47B 83/02; A47B 83/021; A47B 83/0215
USPC ......................................... 312/304, 306, 312
See application file for complete search history.

(56) References Cited

U.S. PATENT DOCUMENTS 3,254,916 A * 6/1966 Bass ...................... A47B 83/02 297/140
3,353,865 A * 11/1967 Bass ...................... A47C 13/00 297/143
3,423,772 A * 1/1969 Mainguy ................ A47B 87/00 5/2.1
3,439,889 A * 4/1969 Karlsen ................ B64D 11/064 244/122 R
3,608,101 A * 9/1971 Castro et al. ........ A47B 81/061 5/2.1
3,635,521 A * 1/1972 Shivvers ................ A47B 85/04 297/125
4,739,781 A * 4/1988 Casoli ................. A47L 15/0086 134/115 R
2004/0262971 A1* 12/2004 Hentges ............... B60N 2/0232 297/378.12
2007/0164157 A1* 7/2007 Park ........................ B60N 2/34 244/118.6
2009/0121523 A1* 5/2009 Johnson ............. B64D 11/0624 297/140
2010/0264791 A1* 10/2010 Rajeswaran ........... A47B 83/00 312/237
2013/0247590 A1* 9/2013 Lu ...................... B64D 11/0604 62/3.6
2015/0307179 A1* 10/2015 Ehlers ....................... B64C 1/20 244/118.1
2016/0122022 A1* 5/2016 Cooke ................ B64D 11/0605 244/118.6
2017/0095089 A1* 4/2017 Pratt ...................... A47B 85/04
2017/0174345 A1* 6/2017 Murnan ................. B64D 11/06
2017/0275002 A1* 9/2017 Ehlers .................. B64D 11/064
2018/0044023 A1* 2/2018 Nojiri .................... B64D 11/04
2018/0055218 A1* 3/2018 Mueller ................... A47B 3/06

* cited by examiner

MULTI-FUNCTION CREDENZA

CROSS-REFERENCE TO RELATED APPLICATIONS

This application claims the benefit of U.S. Provisional Application No. 62/415,128 entitled “Aircraft Interior Configurations” and filed on Oct. 31, 2016, which is herein incorporated by reference in its entirety.

BACKGROUND

Embodiments of this disclosure relate generally to multi-use built-in furniture systems, and more specifically to multi-function storage systems having exchangeable components and multiple configurations for enabling adaptable and customizable aircraft cabins.

SUMMARY

In an embodiment, a multi-function credenza is provided. The multi-function credenza includes at least one cabinet with a first top surface, and a seat adjacent the cabinet. The seat has a convertible seat back for converting to a second top surface adjacent to the first top surface when the seat is stowed.

In another embodiment, a multi-function credenza in an aircraft cabin is provided. The multi-function credenza includes a first cabinet that has a first inboard panel and a first top surface, a second cabinet that has a second inboard panel and a second top surface, and a stowable seat located between the first cabinet and the second cabinet. The stowable seat is convertible between a seating mode and a stowed mode. The stowable seat includes a seat bottom that, in the seating mode, has a cushioned top surface exposed for seating, and a seat back that has a cushioned side and an opposing side. The seat back, when in the seating mode, has the cushioned side exposed for seating. In the stowed mode, the seat back has the opposing side form a third top surface that is positioned between the first top surface and the second top surface. The stowable seat further includes a third inboard panel. In the seating mode, the third inboard panel is positioned beneath the seat bottom. In the stowed mode, the third inboard panel is positioned between the first inboard panel and the second inboard panel.

In yet another embodiment, a stowable seat is provided. The stowable seat includes a seat back that has a first side adapted for seating in a first mode and a second side adapted as a working surface in a second mode. The seat back articulates between the first mode and the second mode for deploying and stowing the seat, respectively.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Currently available aircraft cabinets and storage units are restricted in functionality based on their certification. Modification of cabinets and storage units requires high replacement costs and lengthy time delays because each replacement cabinet/unit requires special tooling for manufacture plus certification for flight. What is needed, especially for smaller aircraft, is a system that provides an ability to alter available storage configurations to accommodate versatile functions, such as those needed for different flight plans, variable numbers of passengers, and customer preferences.

Figure 1:
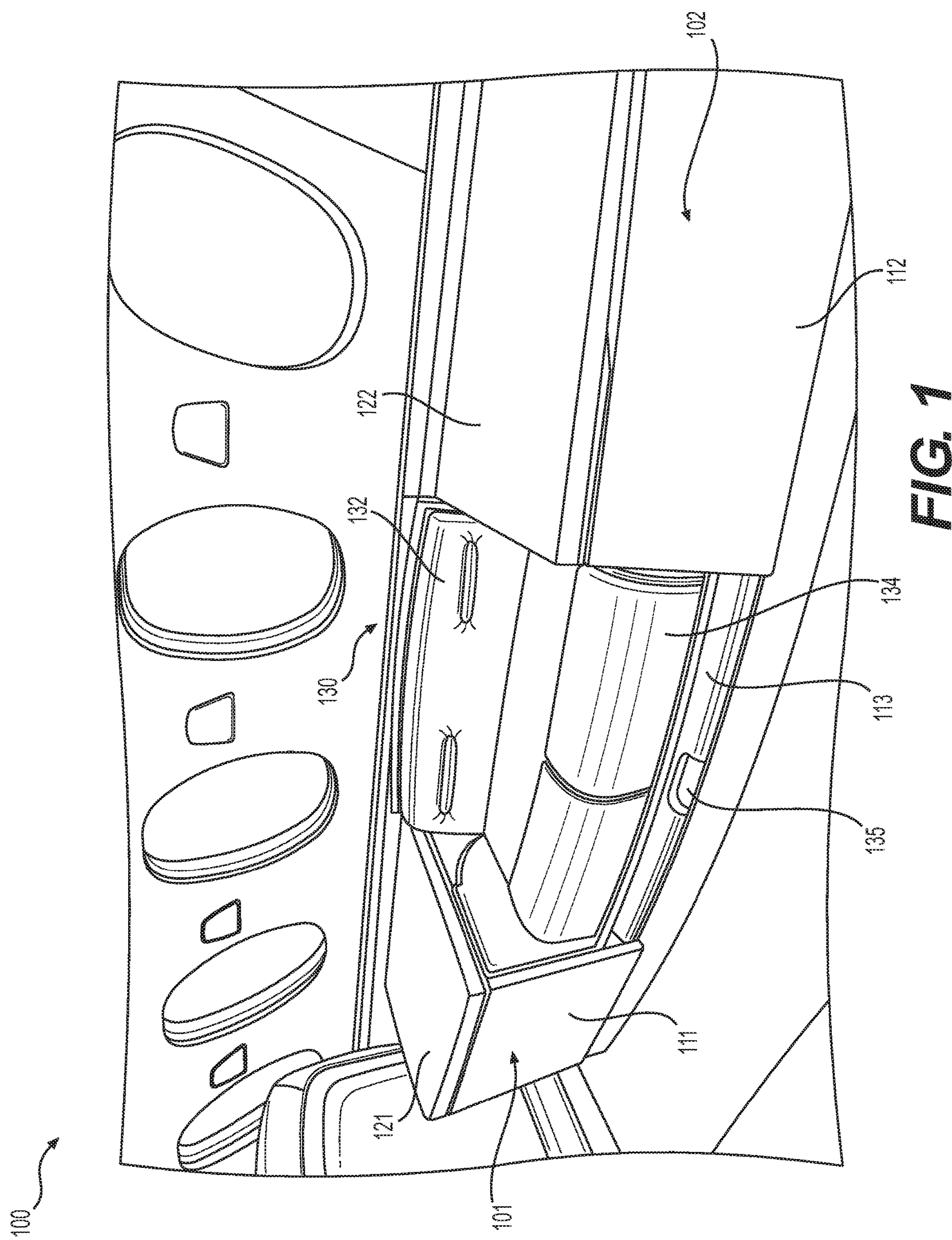
FIG. 1 is a perspective view of one embodiment of a multi-function credenza with a stowable seat in a deployed mode.

FIG. 1 is a perspective view of an exemplary multi-function credenza 100 with a stowable seat 130 in a deployed mode for seating. Multi-function credenza 100 provides a common footprint and form factor and common attachment points for installation. For example, the mounting points, carpet splits, and panel attachments (e.g., in the floor and fuselage) enable the various embodiments of the multi-function credenza, described below, to be exchanged with the embodiment depicted in FIG. 1. In other words, all of the embodiments disclosed herein are adapted for installation in the same location onboard an aircraft. This enables an aircraft manufacturer to offer customization of the cabin layout of a given aircraft model to individual customers by offering a variety of interchangeable multi-function credenzas designed for different uses. Example uses include one or more of seating, entertainment centers, wet bars, mini-kitchens, and supply of medical equipment. Medical equipment may include an array of medical devices, monitors, and disposable supplies for customizing an aircraft as an air ambulance.

Multi-function credenza 100 includes a first cabinet 101 and a second cabinet 102 located on opposite sides of stowable seat 130. First cabinet 101 includes a first panel 111 and a first top surface 121. Similarly, second cabinet 102 includes a second panel 112 and a second top surface 122. First and second top surfaces 121, 122 are configured to provide a working surface (e.g., a counter-top). In certain embodiments, first and second top surfaces 121, 122 are also configured as lids for accessing first and second cabinets 101, 102, respectively. As lids, first and second top surfaces 121, 122 may be opened and closed by pivoting along one edge (e.g., via brackets). Alternatively, or in addition to lids, first and second cabinets 101, 102 may be accessed by a panel door. For example, first and second panels 111, 112 may be configured as panel doors (e.g., that swing via hinges or slide along rails). However, other arrangements for first and second cabinets 111, 112 are possible without departing from the scope hereof.

Stowable seat 130 includes a seat back 132 and a seat bottom 134. A third panel 113 stows beneath seat bottom 134 when stowable seat 130 is deployed for seating (as depicted in FIG. 1). Seat bottom 134 includes a cushioned top surface and seat back 132 includes a cushioned side that faces inboard (e.g., away from the windows). The cushioned side of seat back 132 has at least a portion covered with cushions, upholstery, or other material suitable for providing comfortable seating. In certain embodiments, the cushioned side of seat back 132 includes a perimeter of non-cushioned material surrounding upholstered cushioning, as depicted in FIG. 1.

Figure 2:
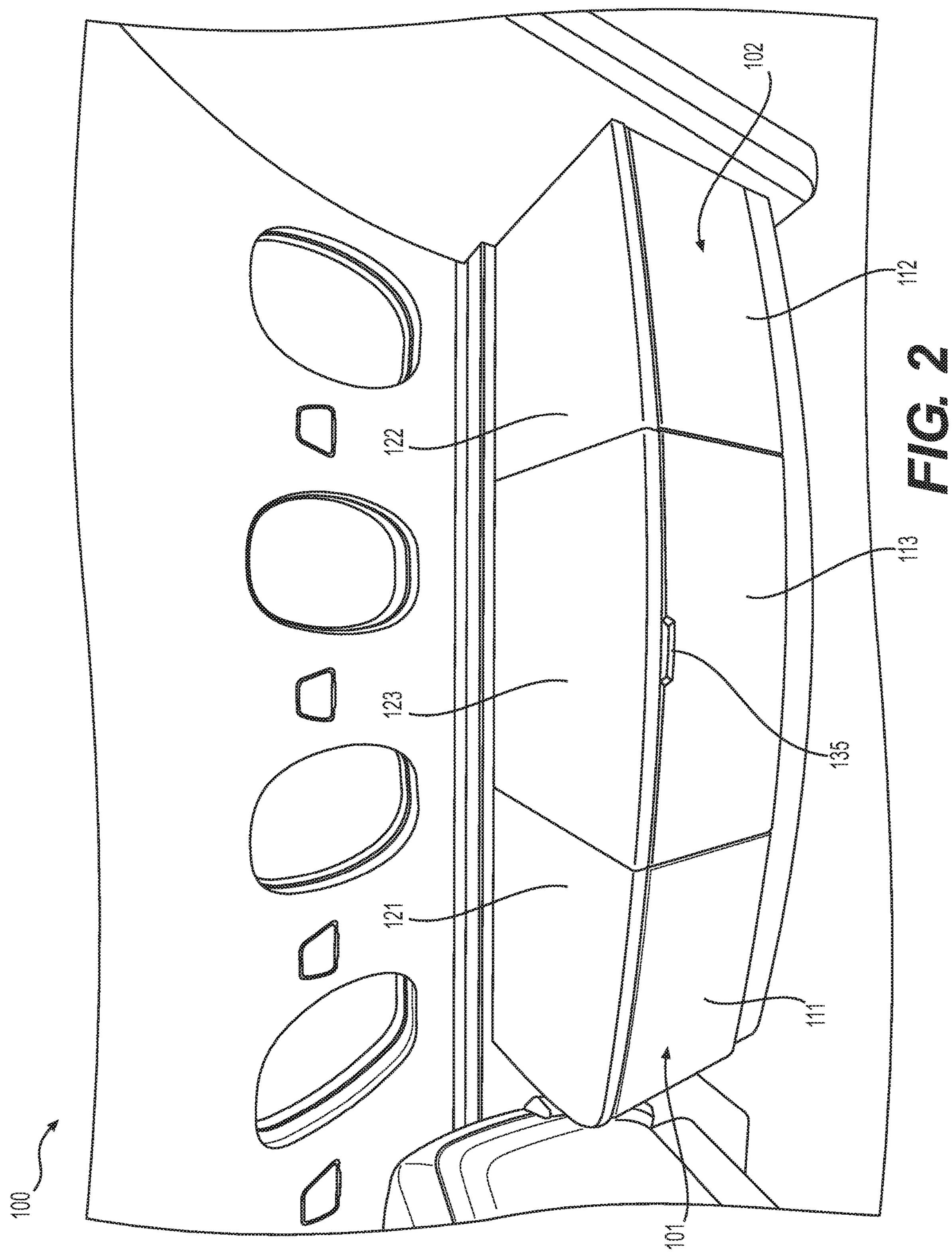
FIG. 2 is a perspective view of the multi-function credenza of FIG. 1 with the stowable seat in a stowed mode.

Transition between a seating mode (as depicted in FIG. 1) and a stowed mode (as depicted in FIG. 2) is enabled by a notch 135 in one edge of panel 113. Notch 135 provides access to seat back 132 and also forms a handle along one edge of panel 113. A user may pull the handle to retrieve third panel 113 from beneath seat bottom 134, causing third panel 113 to move in an inboard and upward direction, as further described below. Seat back 132 may be grasped along a perimeter (e.g., along a top edge) for pulling seat back 132 in an upward and inboard direction to lay substantially flat on top of seat bottom 134, as further described below. While the cushioned side of seat back 132 is configured for seating, the opposite side of seat back 132 is configured as a working surface (e.g., a third top surface 123 as depicted in FIG. 2).

FIG. 2 is a perspective view of multi-function credenza 100 with stowable seat 130 in the stowed mode. Third panel 113 is deployed to conceal seat bottom 134 and provide a panel façade between first and second panels 111, 112. Third top surface 123 is exposed to provide a working surface between first and second top surfaces 121, 122. In certain embodiments, third panel 113 is substantially flush with first and second panels 111, 112 to form a uniform façade. In some embodiments, third top surface 123 is substantially flush with first and second top surfaces 121, 122 to form a substantially continuous working surface. A handle is accessible to a user through notch 135 in third panel 113 for enabling the user to convert stowable seat 130 from the stowed mode depicted in FIG. 2 to the deployed mode depicted in FIG. 1, as further described below.

In operation, stowing and deploying of seat back 132 may be performed using a bearing and slide mechanism. Similarly, third panel 113 may be stowed and deployed using a bearing a slide mechanism. In certain embodiments, seat back 132 and third panel 113 may be deployed and stowed using an articulating mechanism, such as the articulating mechanism described in U.S. Patent Publication 2017/0021749 to Ward et al., entitled Articulating Armrest, which is herein incorporated by reference in its entirety. The articulating armrest translates and pivots along a curvilinear path marked by two stages: a translational stage, in which motion is substantially linear, and a pivoting stage, in which the armrest rotates. This articulating motion is governed by a curvilinear path, in which one or more bearings (e.g., roller bearings), coupled to the armrest, slide within one or more curvilinear tracks. The one or more curvilinear tracks include a substantially straight portion to provide the substantially linear translation and a curved portion to provide the pivoting motion. Movement of the roller bearings within the one or more curvilinear tracks provides a smooth and seamless transition between the translational stage and the pivoting stage. In certain embodiments, a spring (e.g., a clock spring) provides mechanical tension for assisting with deployment of the armrest (i.e., after initiation of movement by a user), a rotational damper controls the speed of the armrest deployment, and a gas spring prevents the armrest from slamming down.

Seat back 134 is moved from an upright orientation in the deployed mode for seating (as depicted in FIG. 1) by first translating upwards, and second, by pivoting downwardly in an inboard direction to lay on top of seat bottom 134. As a result, third top surface 123, which extends below and behind seat bottom 134 when seat back 132 is deployed for seating, translates upwards and pivots downwardly and in an inboard direction to align between first and second top surfaces 121, 122 (as depicted in FIG. 2).

To carry out the reverse procedure for transitioning seat 130 from the stowed mode (as depicted in FIG. 2) to the deployed mode for seating (as depicted in FIG. 1), seat back 132/third top surface 123 first pivots upwardly and in an outboard direction (e.g., towards the cabin windows) to a substantially upright orientation, and second, translates downwards such that a portion of third top surface 123 stows behind and beneath seat bottom 134.

Third panel 113 is deployed from beneath seat bottom 134 (as depicted in FIG. 1) by first translating in an inboard direction, and second, pivoting upwards to an upright orientation (as depicted in FIG. 2).

To carry out the reverse procedure for stowing third panel 113, third panel 113 is pushed downward (e.g., via the handle in notch 135) causing third panel 113 to first pivot downwardly an in an inboard direction to a substantially horizontal orientation, and second, translate in an outboard direction (e.g., towards the cabin windows) to stow beneath seat bottom 134 (as depicted in FIG. 1).

In certain embodiments, a spring (e.g., a clock spring) provides mechanical tension for assisting with lifting of seat back 132 from the seating mode. Likewise, a spring may be used to provide mechanical tension for assisting with lifting of third panel 113 from the stowed mode. In some embodiments, the spring provides sufficient mechanical tension to lift seat back 132 and third panel 113 without lifting assistance provided by the user (except for initiation of movement by the user). In some embodiments, a rotational damper may be used to control the speed of deployment of seat back 132 and/or third panel 113, and a gas spring may be employed to prevent slamming seat back 132 and/or third panel 113.

In certain embodiments, separate curvilinear tracks are provided for seat back 132 and third panel 113. The curvilinear tracks may be located adjacent stowable seat 130 and a neighboring cabinet (e.g., first cabinet 101 or second cabinet 102). In some embodiments, an opposing pair of matching curvilinear tracks are located on opposite sides stowable seat 130 for both seat back 132 and third panel 113. Each track of an opposing pair is located on opposite sides of stowable seat 132, in between stowable seat 132 and a neighboring cabinet (e.g., a first track of an opposing pair is adjacent first cabinet 101, and a second track of the opposing pair is adjacent second cabinet 102).

Figure 3:
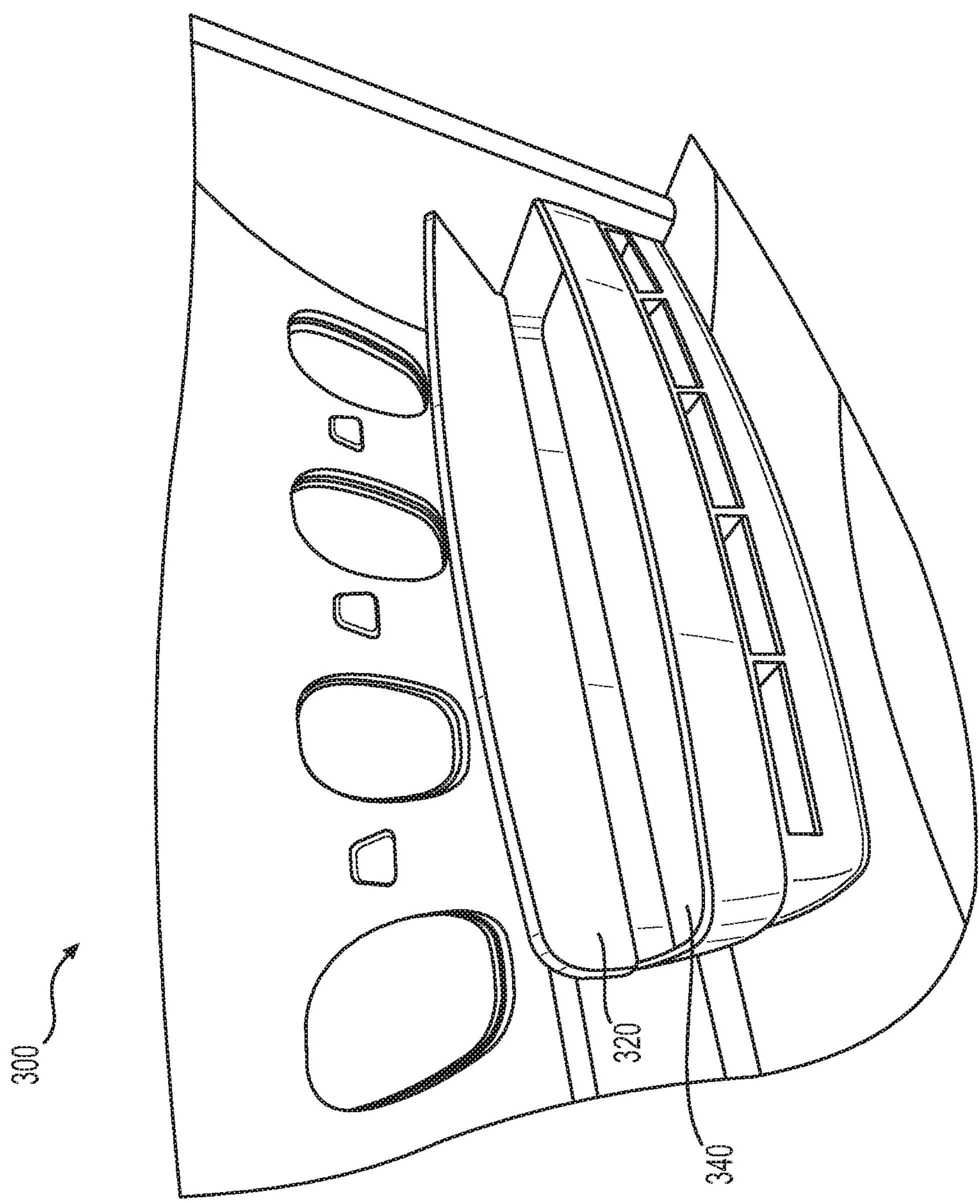
FIG. 3 is a perspective view of one embodiment of a multi-function credenza having a storage compartment.

FIG. 3 is a perspective view of an exemplary multi-function credenza 300 having a storage compartment 340. Multi-function credenza 300 may be exchanged with multi-function credenza 100, FIGS. 1 and 2, for accommodating more storage and less seating. A lid 320 enables access to storage compartment 340 and also provides a working surface when closed. In operation, lid 320 may be lifted from a closed position to the open position depicted in FIG. 3 by pivoting of lid 320 along one side of compartment 340. In certain embodiments, lid 320 includes a biasing device (e.g., a gas spring or clock spring) for assisting a user with lifting lid 320. Similarly, lid 320 may include a damping device (e.g., a damper or dashpot) for damping downward motion of lid 320 while closing (e.g., to prevent slamming). In some embodiments, lid 320 may be split into more than one separate lid and storage compartment 340 may be separated into more than one compartment (see FIG. 4).

Figure 4:
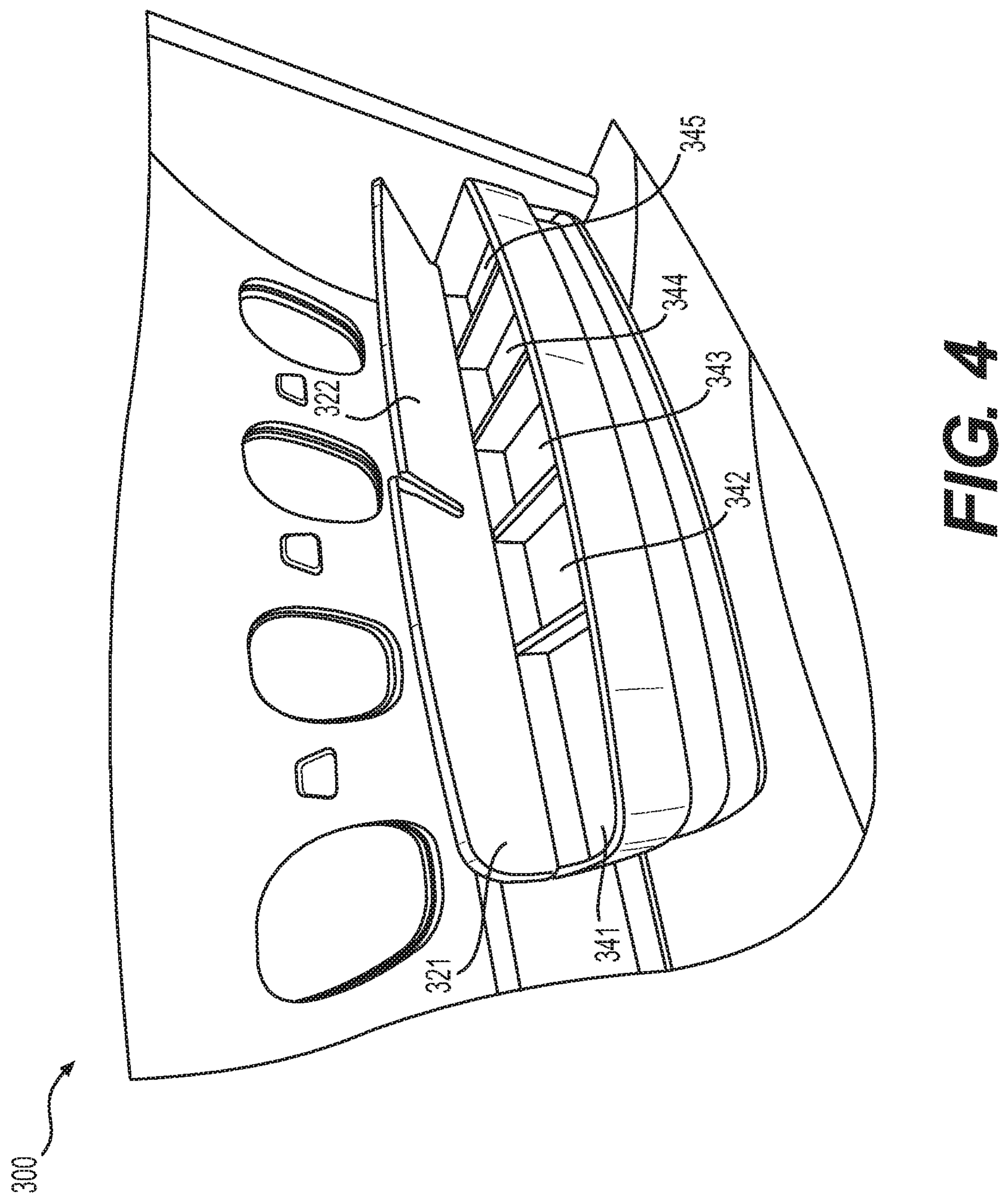
FIG. 4 is a perspective view of another embodiment of the multi-function FIG. 3 having multiple storage compartments.

FIG. 4 is a perspective view of multi-function credenza 300 configured with two lids and multiple storage compartments. As depicted in FIG. 4, multi-function credenza 300 includes a first lid 321 and a second lid 322, which are examples of lid 320, FIG. 3, and a first, second, third, fourth, and fifth storage compartment 341, 342, 343, 344, and 345. FIG. 4 is merely exemplary and multi-function credenza 300 may be configured with greater than two lids and greater or fewer than five storage compartments without departing from the scope hereof. The multiple storage compartments may be formed of adjustable dividers such that the size and number of storage compartments is adjustable.

Figure 5:
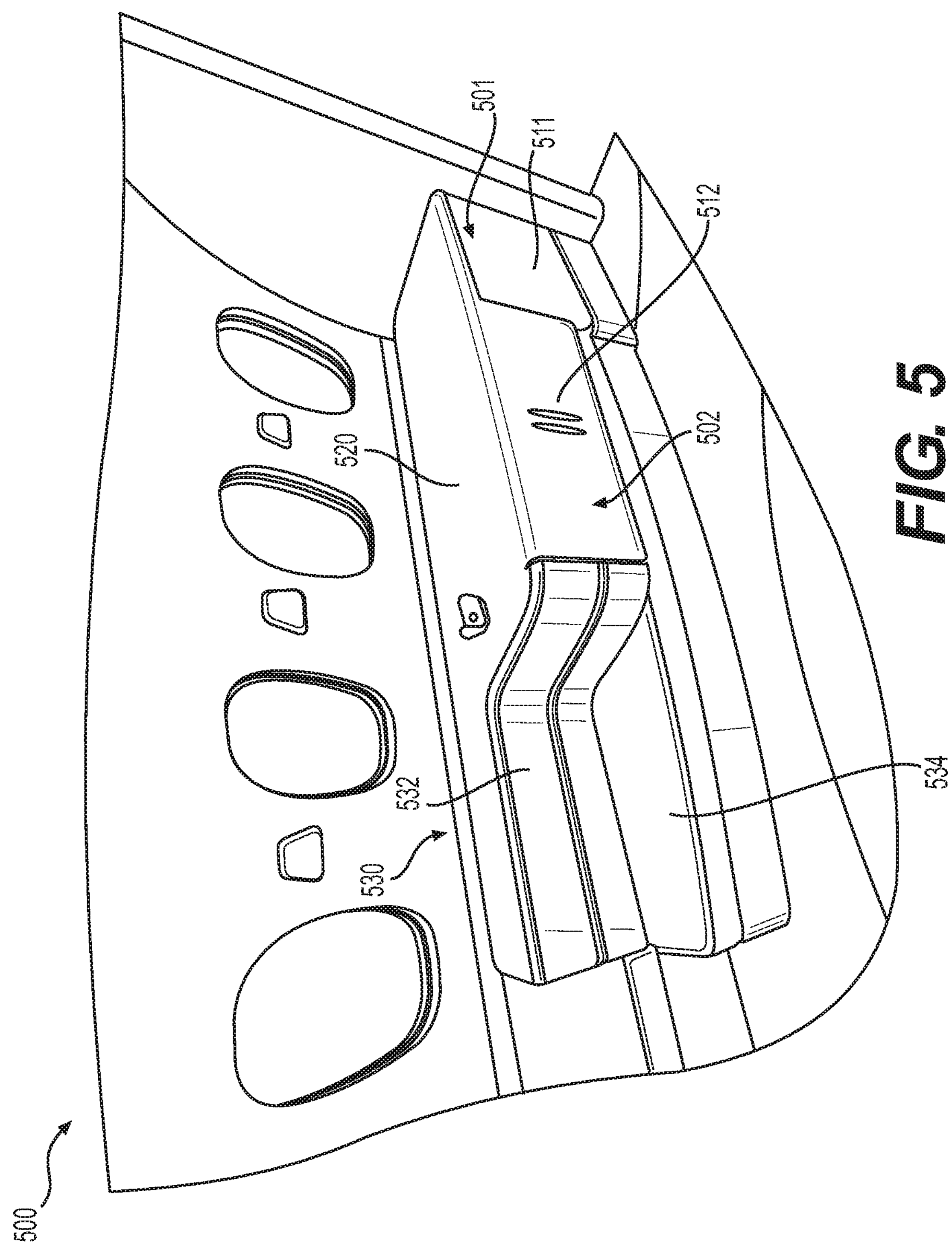
FIG. 5 is a perspective view of one embodiment of a multi-function credenza having a seat.

FIG. 5 is a perspective view of an exemplary multi-function credenza 500 having a seat 530. Seat 530 includes a seat back 532 and a seat bottom 534. Unlike stowable seat 130, FIG. 1, seat 530 remains in a seat configuration and is not stowable. Multi-function credenza 500 may be exchanged with multi-function credenza 100, FIGS. 1 and 2, for providing a permanent (non-stowable) seat.

Credenza 500 includes a top surface 520, which is an example of top surface 320, FIG. 3 adapted to accommodate seat 530. A first cabinet 501 is concealed behind a first panel 511, and a second cabinet 502 is concealed behind a second panel 512. First panel 511 may be used to access first cabinet 501 by pivoting downward or in an inboard direction, for example. Second panel 512 may include two halves that each pivot in an inboard direction.

Figure 6:
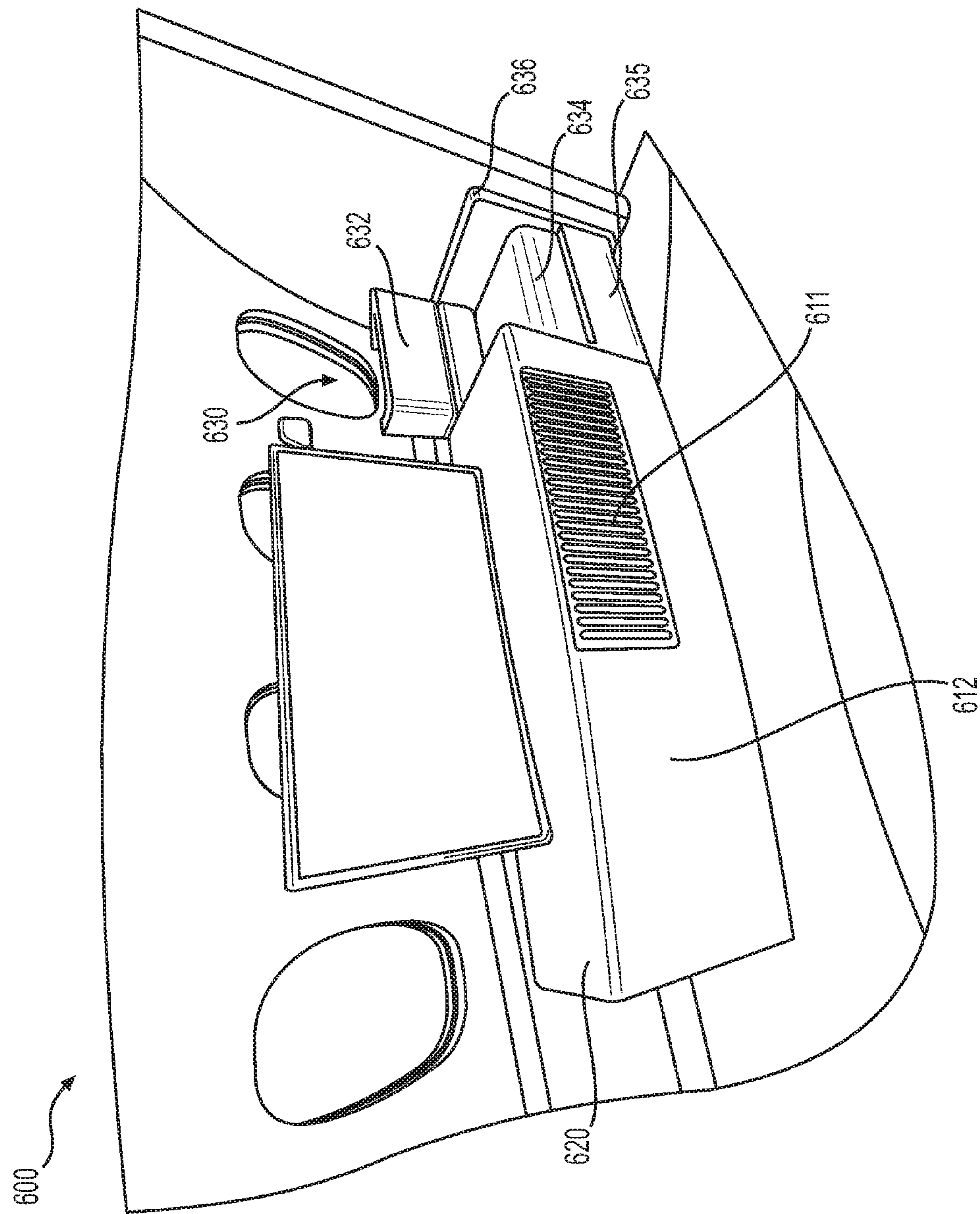
FIG. 6 is a perspective view of another embodiment of a multi-function credenza having a seat.

FIG. 6 is a perspective view of an exemplary multi-function credenza 600 having a seat 630. Multi-function credenza 600 is an example of multi-function credenza 500 with a different type of seat located in a different position. Seat 630 includes a seat back 632 and a seat bottom 634, and may further include a footrest 635 and one or more armrests 636. A first panel 611 may slide or pivot for accessing one or more storage compartments 612 beneath a top surface 620. In certain embodiments, a storage compartment 612 behind first panel 611 includes electronic equipment such as for an entertainment center. Top surface 620 may also serve as a removable or pivotable lid for accessing one or more storage compartments upon removal of the television.

Figure 7:
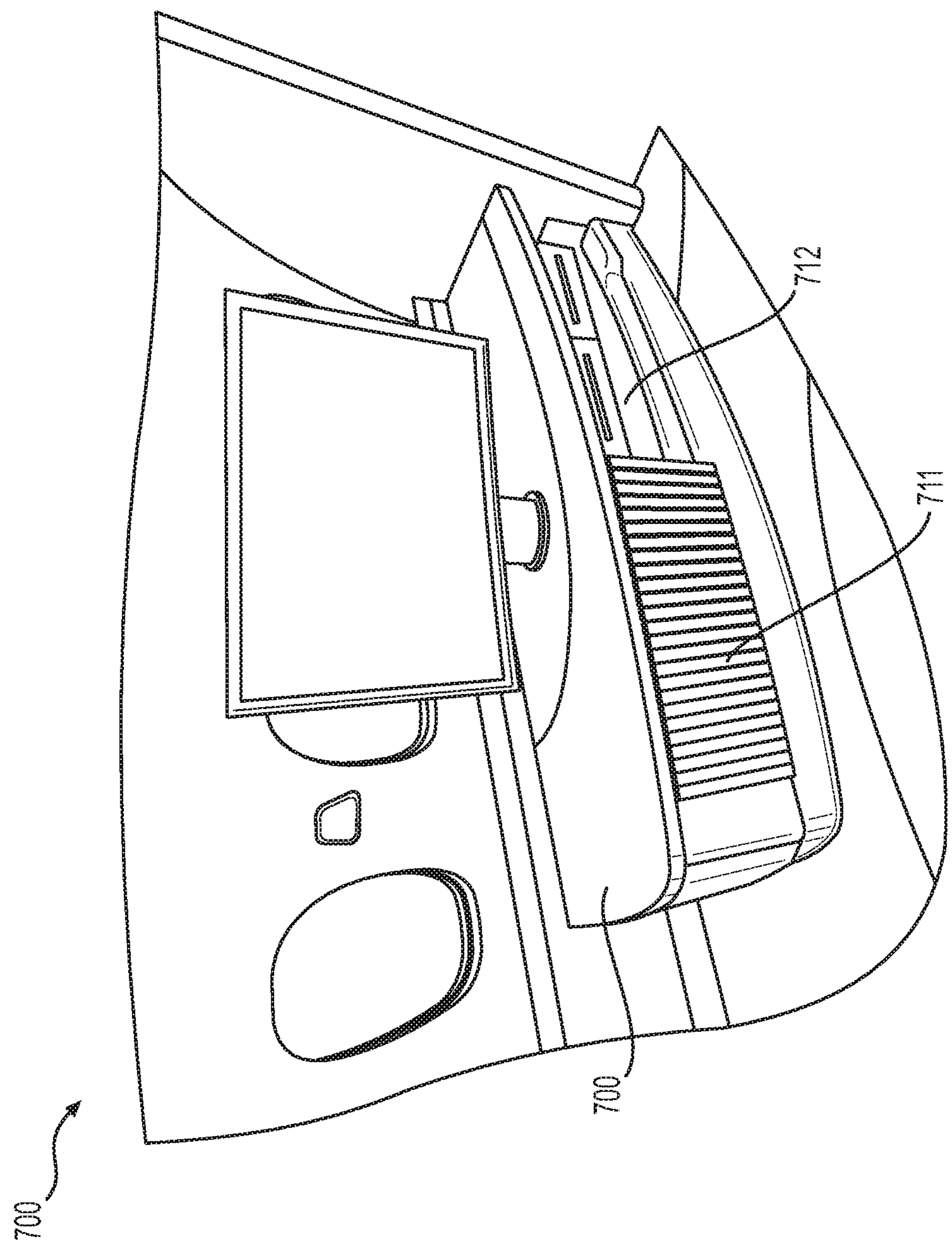
FIG. 7 is a perspective view of one embodiment of a multi-function credenza having an entertainment center.

FIG. 7 is a perspective view of an exemplary multi-function credenza 700 having an entertainment center 712. Multi-function credenza 700 is similar to multi-function credenza 600 without a seat. A first panel 711 may slide to alternatively conceal and reveal entertainment center 712. A top surface 720 may also serve as a removable or pivotable lid for accessing one or more storage compartments upon removal of the television.

Figure 8:
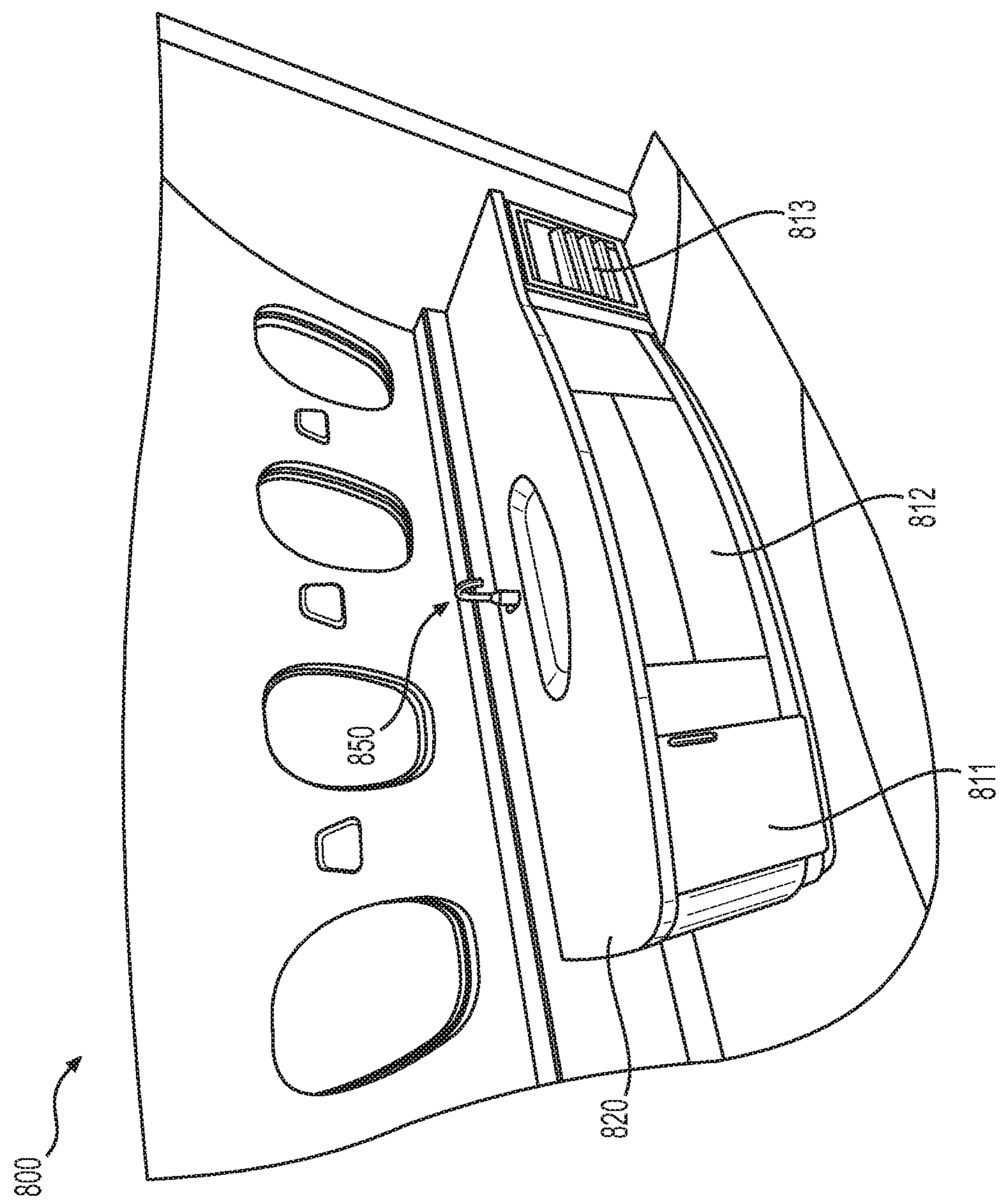
FIG. 8 is a perspective view of one embodiment of a multi-function credenza having a sink.

FIG. 8 is a perspective view of an exemplary multi-function credenza 800 having a sink 850. Sink 850 includes a faucet and a basin, which are adapted into a top surface 820. A first panel 811 is for example a door for accessing a storage compartment. A second panel 812 is for example a drawer that provides storage beneath sink 850. A third panel 813 is for example a door to a refrigerator.

Figure 9:
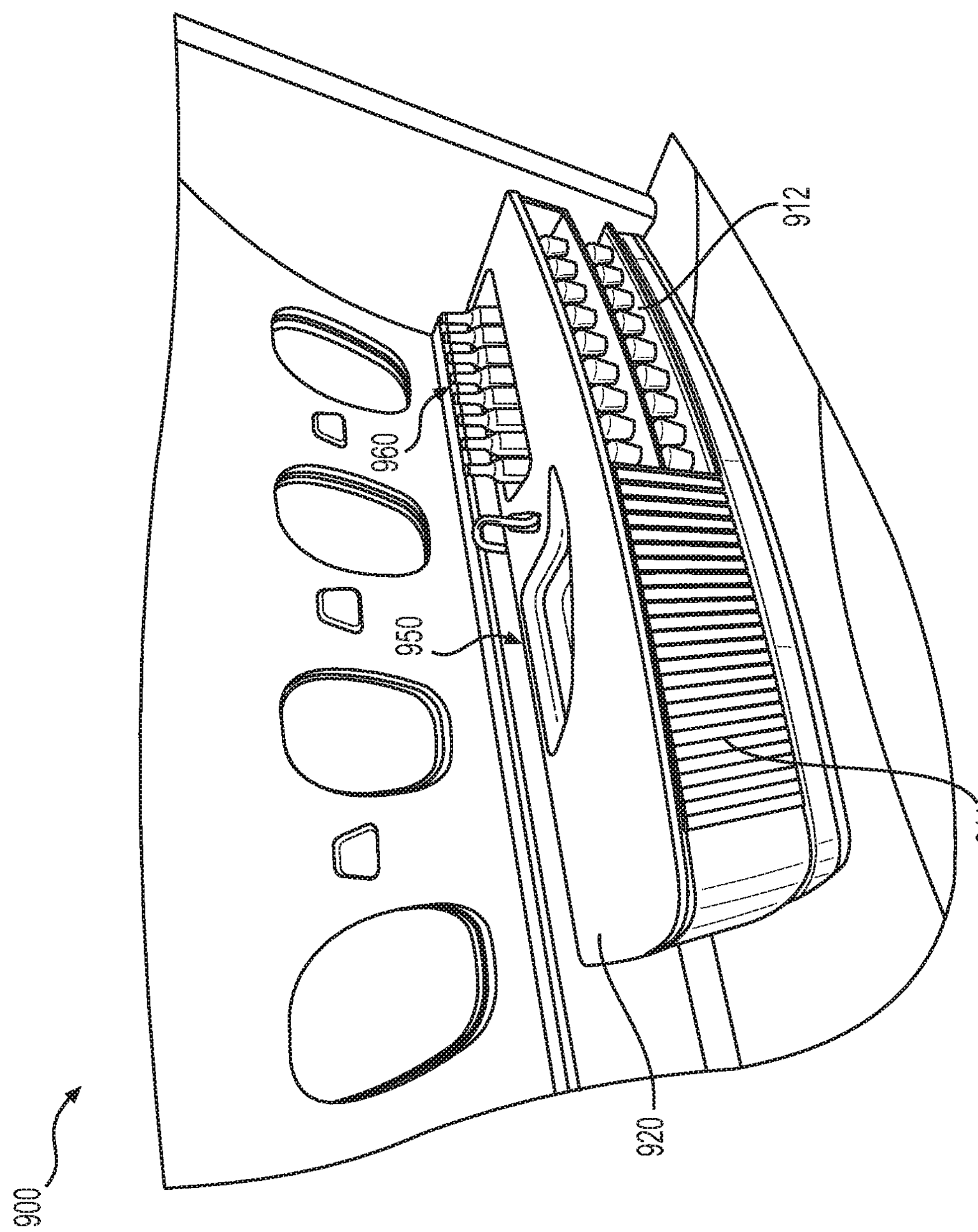
FIG. 9 is a perspective view of another embodiment of a multi-function credenza having a sink.

FIG. 9 is a perspective view of an exemplary multi-function credenza 900 having a sink 950. Sink 950 includes a faucet and a basin, which are adapted into a top surface 920. A well 960 is configured for storing items (e.g., beverage containers). A first panel 911 may slide in opposite directions to alternatively conceal and reveal a storage compartment 912, which may include shelves or racks for storing items (e.g., beverage glasses).

Multi-function credenzas 800 and 900 are interchangeable with other embodiments of multi-function credenzas 100, 300, 500, 600, 700 to provide various functionality (e.g., storage, seating, working surfaces, and a sink) within the cabin of a particular aircraft model, without requiring high replacement costs and lengthy time delays due to specialized tooling for manufacture and certification for flight.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

We claim:

1. An aircraft multi-function credenza system, comprising:

an interchangeable multi-function credenza, comprising:

at least one cabinet having a first top surface and a first front panel;

a seat adjacent the cabinet, the seat having a seat bottom and a convertible seat back for converting to a second top surface adjacent to the first top surface when the seat is stowed;

a second front panel flush with the first front panel for concealing the seat when the seat is stowed, the second front panel being retractable for retracting beneath the seat when the seat is deployed, wherein the second front panel is substantially perpendicular to the second top surface when the seat is stowed; and a predetermined footprint abutting a fuselage wall within an aircraft cabin of for a particular type of aircraft; and common attachment mechanisms disposed in common attachment points that are located beneath the multi-function credenza for attaching to a floor of the aircraft, such that the interchangeable multi-function credenza is adapted for installation in the same location abutting the inner fuselage wall in any aircraft cabin of the particular type of aircraft.

2. The aircraft multi-function credenza system of claim 1, wherein the first top surface is adapted as a lid for opening to access the at least one cabinet.

3. The aircraft multi-function credenza system of claim 2, wherein the first top surface, when closed, lies substantially flush with the second top surface when the seat is stowed to form a substantially continuous working surface.

4. The aircraft multi-function credenza system of claim 1, wherein the seat back includes a first side that is cushioned for seating and a second side adapted as the second top surface when the seat is stowed.

5. The aircraft multi-function credenza system of claim 1, wherein the first front panel is configured for concealing the at least one cabinet, and the first front panel is slidable for accessing an interior of the at least one cabinet.

6. The aircraft multi-function credenza system of claim 1, the second front panel being retractable for retracting from a substantially upright orientation for concealing the seat to a substantially horizontal orientation for stowing beneath the seat.

7. The aircraft multi-function credenza system of claim 6, wherein the second front panel includes a notch for accessing a handle enabling a user to initiate retraction from the substantially upright orientation for concealing the seat to the substantially horizontal orientation for stowing beneath the seat.

8. The aircraft multi-function credenza system of claim 1, further comprising a first bearing and slide mechanism for enabling rotating and stowing of the seat back, such that the seat back stows behind and partially below the seat bottom, and a second bearing and slide mechanism enabling retracting and stowing of the second front panel beneath the seat.

9. The aircraft multi-function credenza system of claim 1, wherein the at least one cabinet includes a sink located in the first top surface.

10. A multi-function credenza in an aircraft cabin, comprising:
- a first cabinet having a first inboard panel and a first top surface;
- a second cabinet having a second inboard panel aligned with the first inboard panel, and a second top surface aligned with the first top surface;
- a stowable seat located between the first cabinet and the second cabinet, the seat having a convertible seat back for converting to a third top surface when the seat is stowed, and a third inboard panel for concealing the seat when the seat is stowed, the third inboard panel being retractable for retracting beneath the seat when the seat is deployed, wherein the third inboard panel is substantially perpendicular to the third top surface when the seat is stowed;
- a predetermined footprint abutting an inner fuselage wall in the aircraft cabin;
- common attachment mechanisms disposed at common attachment points beneath the multi-function credenza for attaching to a floor of the aircraft against the inner fuselage wall of the aircraft, such that the multi-function credenza is adapted for installation in the same location against the inner fuselage wall in the aircraft cabin for a particular type of aircraft.

11. The multi-function credenza of claim 10, wherein the stowable seat is convertible between a seating mode and a stowed mode, the stowable seat comprising:
- a seat bottom, in the seating mode, having a cushioned top surface exposed for seating;
- a seat back having a cushioned side and an opposing side;
- the seat back, in the seating mode, having the cushioned side exposed for seating and the opposing side extends behind and partially below the seat bottom such that no gap exists between the cushioned top surface of the seat bottom and the cushioned side of the seat back;
- the seat back, in the stowed mode, having the opposing side form a third top surface, the third top surface being positioned between the first top surface and the second top surface;
- a third inboard panel, in the seating mode, positioned beneath the seat bottom;
- the third inboard panel, in the stowed mode, positioned between the first inboard panel and the second inboard panel; and
- the third inboard panel and the third top surface, in the stowed mode, conceal the stowable seat.

12. The multi-function credenza of claim 11, wherein the third top surface, in the stowed mode, is substantially flush with the first top surface and the second top surface to form a substantially continuous working surface.

13. The multi-function credenza of claim 11, wherein the third inboard panel, in the stowed mode, is substantially flush with the first inboard panel and the second inboard panel to form a uniform façade.

14. An exchangeable multi-function credenza system, comprising:
- a first credenza configured for installation against an inner fuselage wall of an aircraft cabin, the first credenza comprising:
  - a first functional feature and a second functional feature each accessible for use when the first credenza is installed in the aircraft cabin;
  - wherein the first functional feature is a stowable seat, comprising:
    - a seat back having a first side adapted for seating in a first mode and a second side adapted as a working surface in a second mode; the seatback articulates between the first mode and the second mode for deploying and stowing the seat, respectively; and a front panel for concealing the seat when the seat is stowed, the front panel being retractable for retracting beneath the seat when the seat is deployed, wherein the front panel is substantially perpendicular to the seatback when the seat is stowed;
  - a plurality of common attachment mechanisms configured for securely attaching to a floor at a predetermined location against the fuselage wall in any aircraft cabin of a given aircraft type; and
  - a predetermined footprint adapted for installation in any aircraft cabin of the given aircraft type; and
- a second credenza comprising:
  - a third functional feature accessible for use when the second credenza is installed in the aircraft cabin; and
  - a plurality of common attachment mechanisms configured for securely attaching to the floor at the predetermined location against the fuselage wall; and
  - the predetermined footprint such that the second credenza is exchangeable with the first credenza at the predetermined location against the fuselage wall.

15. The system of claim 14, wherein the second functional feature is a storage cabinet and the third functional feature is a sink.

16. The system of claim 14, wherein the second credenza further comprises a fourth functional feature accessible for use when the second credenza is installed in an aircraft cabin.

17. The system of claim 16, wherein the second functional feature is an entertainment center, the third functional feature is a sink, and the fourth functional feature is a refrigerator.

* * * * *